United States Patent
Han et al.

(10) Patent No.: US 7,054,522 B1
(45) Date of Patent: May 30, 2006

(54) BIDIRECTIONAL OPTICAL RECIRCULATION LOOP TRANSMITTING DEVICE

(75) Inventors: Jinsoo Han, Daejeon (KR); Kwangjoon Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 11/137,467

(22) Filed: May 26, 2005

(30) Foreign Application Priority Data

Dec. 9, 2004 (KR) .................. 10-2004-0103673

(51) Int. Cl.
  *G02B 6/28* (2006.01)
(52) U.S. Cl. .................. 385/24; 398/58; 398/67; 398/73
(58) Field of Classification Search ............ 398/58–64, 398/67, 68, 73–79; 385/24
  See application file for complete search history.

(56) References Cited

U.S. PATENT DOCUMENTS

| | | | | |
|---|---|---|---|---|
| 5,812,306 | A * | 9/1998 | Mizrahi | .................... 359/341.2 |
| 6,160,660 | A | 12/2000 | Aina et al. | |
| 6,313,933 | B1 * | 11/2001 | Iwano | ......................... 398/79 |
| 2001/0038477 | A1 * | 11/2001 | Hwang | ....................... 359/124 |

FOREIGN PATENT DOCUMENTS

KR  1020020059914  7/2002

OTHER PUBLICATIONS

Lara D. Garrett, et al.; "Bidirectional ULH Transmission of 160-Gb/s Full-Duplex Capacity Over 500 km in a Fully Bidirectional Recirculating Loop"; IEEE Photonics Technology Letters; vol. 16; No. 7; Jul. 2004; pp. 1757-1759.
Yamashita, et al.; "Experimental demonstration of bidirectional eight-channel WDM transmission via multiple repeaters containing a fluoride-based fiber amplifier"; OFC '97 Technical Digest; pp. 46-47.
S. Radic, et al.; "25 GHz Interleaved Bidirectional Transmission Over Non-Zero Dispersion Shifted Fiber"; ThF7-1 to ThF7-3.

* cited by examiner

*Primary Examiner*—Michelle Connelly-Cushwa
*Assistant Examiner*—Rhonda S. Peace
(74) *Attorney, Agent, or Firm*—Mayer, Brown, Rowe & Maw LLP (57) ABSTRACT

This apparatus of bidirectional optical recirculation loop transmission enables bidirectional transmission system to be tested in the long transmission distance. Unidirectional optical recirculation loop is composed of two optical modulators and one 4-port optical coupler. Bidirectional optical recirculation loop is composed of four optical switches, one 4-port optical coupler and six optical circulators. Two optical circulators at the entrance (simultaneously exit) of the loop enable transmitted (received) signals to be added (dropped). Four optical circulators enable forward (reverse) signal to bypass the optical switch set for reverse (forward) signal in the inner optical loop. Forward (reverse) signal can be transmitted simultaneously with the reverse (forward) signal without interference. Two independent optical recirculation loops exist on the same fiber link in each direction.

15 Claims, 5 Drawing Sheets

BIDIRECTIONAL OPTICAL RECIRCULATION LOOP TRANSMITTING DEVICE

CROSS-REFERENCE TO RELATED PATENT APPLICATIONS

This application claims the benefit of Korean Patent Application No. 10-2004-0103673, filed on Dec. 9, 2004, in the Korean Intellectual Property Office, the disclosure of which is incorporated herein in its entirety by reference.

BACKGROUND OF THE INVENTION

1. Field of the Invention

The present invention relates to a bidirectional optical recirculation loop transmitting device, and more particularly, to a bidirectional optical recirculation loop transmitting device capable of long-distance transmission using a small number of test samples in a wavelength division multiple optical transmission system.

2. Description of the Related Art

Figure 1:
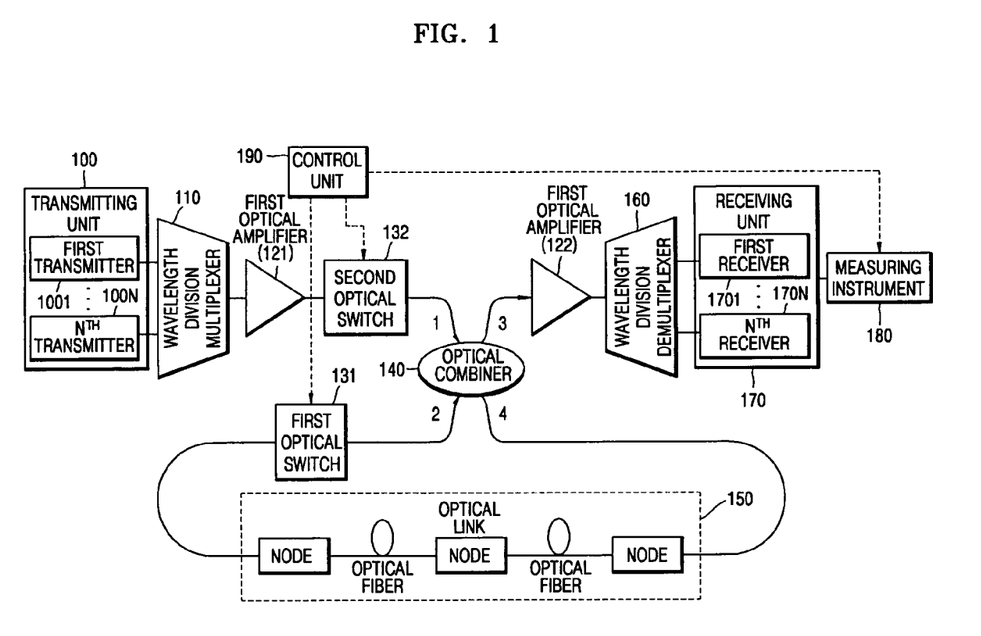
FIG. 1 is a view illustrating a configuration of a conventional uni-directional optical recirculation loop transmitting device.

FIG. 1 shows a configuration of a conventional unidirectional optical recirculation loop transmitting device. Referring to FIG. 1, the conventional unidirectional optical recirculation loop transmitting device includes a transmitting unit 100 for generating and transmitting an N-number of optical signals, a wavelength division multiplexer (WDM) 110 for multiplexing the N-number of optical signals, a first optical amplifier 121 for amplifying multiplexed optical signals, a second optical switch 132 for selectively passing an optical signal output from the first optical amplifier under the control of a controller 190 that is described later, an optical combiner 140 for separating an optical signal output from the second optical switch 132 into two optical signals and outputting the separated optical signals, an optical link 150 that is a path along which one of the separated optical signals is transmitted, a first optical switch 131 for selectively passing the optical signal transmitted along the optical link 150 under the control of the controller 190, a second optical amplifier 122 for amplifying the other one of the two optical signal separated from the optical combiner 140, a wavelength division demultiplexer 160 for separating an optical signal output from the second optical amplifier 122 according to the wavelength of each channel, a receiving unit 170 for receiving an optical signal output from the wavelength division demultiplexer 160, a measuring instrument 180 connected to the receiving unit 170 and monitoring performance of an optical signal per channel of the unidirectional optical recirculation loop transmitting device, and the controller 190 for controlling the first optical switch 131, the second optical switch 132, and the measuring instrument 180.

The transmitting unit 100 consists of an N-number of transmitters from a first transmitter 1001 to an $N^{th}$ transmitter 100N. The receiving unit 170 consists of an N-number of receivers from a first receiver 1701 to an $N^{th}$ receiver 170N. The optical link 150, which is a transmission path of an optical signal, consists of a plurality of nodes and optical fibers.

Figure 2:
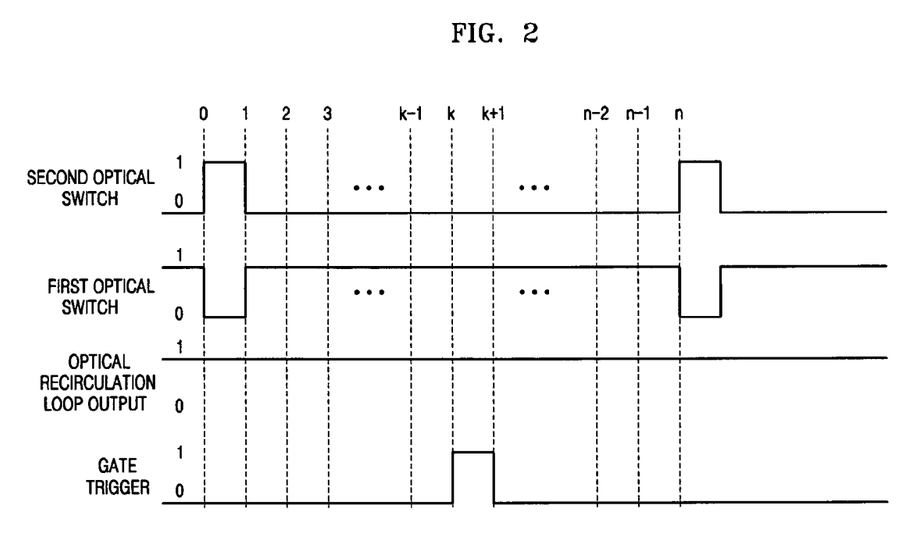
FIG. 2 is a time diagram with respect to a first optical switch signal, a second optical switch signal, an optical recirculation loop output signal, and a gate trigger signal of FIG. 1.

FIG. 2 is a time diagram with respect to the first optical switch signal, the second optical switch signal, an optical recirculation loop output signal, and a gate trigger signal of FIG. 1. Referring to FIG. 2, the first optical switch 131 and the second optical switch 132 operate in the opposite states. That is, from a time point at which t=0 to a time point at which t=1T, the second optical switch 132 is in an "ON" state while the first optical switch 131 is in an "OFF" state. Also, from a time point at which t=1 T to a time point at which t=nT, the second optical switch 132 is in the "OFF" state while the first optical switch 131 is in the "ON" state. It can be seen that a period when the second optical switch 132 remains in the "ON" state is equivalent to a time T needed for the optical signal to proceed in the optical link 150 in the optical recirculation loop.

When the second optical switch 132 is in the "ON" state from the time point at which t=0 to the time point at which t=1T, the optical signal output from the transmitting unit 100 is input to a first port of the optical combiner 140 having four ports: half of the input optical signal is transmitted to the receiving unit 170 via a third port and the other half is transmitted to the optical link 150 via a fourth port. An optical signal equivalent to the time T output from the transmitting unit 100 from the time point at which t=0 to the time point at which t=1 T is transmitted to the receiving unit 170 and the optical signal equivalent to the time T remains in the optical link 150.

When the second optical switch 132 is in the "OFF" state and the first optical switch 131 is in the "ON" state at the time point at which t=1T, the optical signal passing through the optical link 150 is input to a second port of the optical combiner 140 having four ports: half of the input optical signal is transmitted to the receiving unit 170 via the third port and the other half is transmitted to the optical link 150 again via the fourth port.

According to the same operation principle, as time passes, optical signals having traveled a longer distance are sequentially received by the receiving unit 170. As shown in FIG. 2, the receiving unit 170 can receive an optical signal transmitted after rotating an n−1 turn.

When the length of the optical link 150 is M km, the receiving unit 170 can sequentially receive an optical signal transmitted 0 km to (n−1)M km. Since the optical signals sequentially arrive at the receiving unit 170, in FIG. 2, the optical intensity at the receiving unit 170 represented by an optical recirculation loop output is detected to indicate that an optical signal is always present.

When performance of an optical signal corresponding to a desired transmission distance is to be measured by the measuring instrument 180 connected to the receiving unit 170, only a range of the optical signals corresponding to the number of rotations needs to be detected from the sequential signals. To do so, only a portion corresponding to a particular rotation number k is gated like the gate trigger in FIG. 2 to use only a value from a time point at which t=kT to a time point at which t=(k+1)T as a measurement material while the other portion is excluded from the measurement material. Since there may be a contaminated optical signal at around a boundary region of the rotation number when gate trigger is performed, to avoid a measurement error, a protection time Δ is provided at either side of the boundary so that the performance of the optical signal is measured from a time point at which t=kT+Δ to a time point at which t=(k+1)T−Δ. By configuring the optical recirculation loop as above and conducting the test, a long distance transmission is made possible with a small number of test samples.

However, the conventional unidirectional optical recirculation loop transmitting device described with reference to FIGS. 1 and 2 has a problem that an optical signal proceeding in the opposite direction cannot be generated. That is, the conventional transmitting device can be used for a unidirectional optical recirculation loop transmitting device, but it cannot be used for a bidirectional optical recirculation loop transmitting system.

SUMMARY OF THE INVENTION

To solve the above and/or other problems, the present invention provides a bidirectional optical recirculation loop transmitting device using an optical recirculation loop having a plurality of optical switches and a 4-port optical combiner, and an optical circulator for separating or inserting a forward directional optical signal and a reverse directional optical signal.

The present invention provides a bidirectional optical recirculation loop transmitting device using an optical recirculation loop having a plurality of optical switches and a 4-port optical combiner, and an interleaver for separating or inserting a forward directional optical signal and a reverse directional optical signal.

The present invention provides a bidirectional optical recirculation loop transmitting device using an optical recirculation loop having a plurality of optical switches and a 4-port optical combiner, and an band pass filter for separating or inserting a forward directional optical signal and a reverse directional optical signal.

According to an aspect of the present invention, a bidirectional optical recirculation loop transmitting device for transmitting a forward directional optical signal generated from an end and a reverse directional optical signal generated from the other end to the other end and the end, respectively, comprises an optical combiner having four ports which, when receiving an optical signal from a first port and a second port, separately outputs one to a third port and the other to a fourth port and, when receiving an optical signal from the third port and the fourth port, separately outputs one to the first port and the other to the second port, a first optical circulator which receives the forward directional optical signal generated from the end and outputs the received forward directional optical signal to connect to the first port of the optical combiner, and receives the reverse directional optical signal from the first port of the optical combiner and outputs the received reverse directional optical signal to a receiving end of the reverse directional optical signal formed at the end, a second optical circulator which receives the reverse directional optical signal generated from the other end and outputs the received reverse directional optical signal to connect to the third port of the optical combiner, and receives the forward directional optical signal from the third port of the optical combiner and outputs the received forward directional optical signal to a receiving end of the forward directional optical signal formed at the other end, a first connection unit which allows an optical link and the second port of the optical combiner to be in an "ON" connection state during a period from a time point at which the forward directional optical signal is stopped from being input to the first optical circulator to a time point at which the input of the forward directional optical signal resumes, and a second connection unit which allows the optical link and the fourth port of the optical combiner to be in an "ON" connection state during a period from a time point at which the reverse directional optical signal is stopped from being input to the second optical circulator to a time point at which the input of the reverse directional optical signal resumes.

According to another aspect of the present invention, a bidirectional optical recirculation loop transmitting device for transmitting a forward directional optical signal generated from an end and a reverse directional optical signal generated from the other end to the other end and the end, respectively, comprises an optical combiner having four ports which, when receiving an optical signal from a first port and a second port, separately outputs one to a third port and the other to a fourth port and, when receiving an optical signal from the third port and the fourth port, separately outputs one to the first port and the other to the second port, a first interleaver which receives the forward directional optical signal from a transmitting end of the forward directional optical signal and outputs the received forward directional optical signal to connect to the first port of the optical combiner, and receives the reverse directional optical signal from the first port of the optical combiner and outputs the received reverse directional optical signal to a receiving end of the reverse directional optical signal formed at the end, a second interleaver which receives the reverse directional optical signal from a transmitting end of the reverse directional optical signal and outputs the received reverse directional optical signal to connect to the third port of the optical combiner, and receives the forward directional optical signal from the third port of the optical combiner and outputs the received forward directional optical signal to a receiving end of the forward directional optical signal formed at the other end, a first connection unit which allows an optical link and the second port of the optical combiner to be in an "ON" connection state during a period from a time point at which the forward directional optical signal is stopped from being input to the first interleaver to a time point at which the input of the forward directional optical signal resumes, and a second connection unit which allows the optical link and the fourth port of the optical combiner to be in an "ON" connection state during a period from a time point at which the reverse directional optical signal is stopped from being input to the second interleaver to a time point at which the input of the reverse directional optical signal resumes.

According to another aspect of the present invention, a bidirectional optical recirculation loop transmitting device for transmitting a forward directional optical signal generated from an end and formed of a lower band and a reverse directional optical signal generated from the other end and formed of an upper band to the other end and the end, respectively, comprises an optical combiner having four ports which, when receiving an optical signal from a first port and a second port, separately outputs one to a third port and the other to a fourth port and, when receiving an optical signal from the third port and the fourth port, separately outputs one to the first port and the other to the second port, a first band selection filter which receives the forward directional optical signal from a transmitting end of the forward directional optical signal and outputs the received forward directional optical signal to connect to the first port of the optical combiner, and receives the reverse directional optical signal from the first port of the optical combiner and outputs the received reverse directional optical signal to a receiving end of the reverse directional optical signal formed at the end, a second band selection filter which receives the reverse directional optical signal from a transmitting end of the reverse directional optical signal and outputs the received reverse directional optical signal to connect to the third port of the optical combiner, and receives the forward directional optical signal from the third port of the optical combiner and outputs the received forward directional optical signal to a receiving end of the forward directional optical signal formed at the other end, a first connection unit which allows an optical link and the second port of the optical combiner to be in an "ON" connection state during a period from a time point at which the forward directional optical signal is stopped from being input to the first band selection filter to a time point at which the input of the forward directional optical signal resumes, and a second connection unit which allows the optical link and the fourth port of the optical combiner to be in an "ON" connection state during a period from a time point at which the reverse directional optical signal is stopped from being input to the second band selection filter to a time point at which the input of the reverse directional optical signal resumes.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 3:
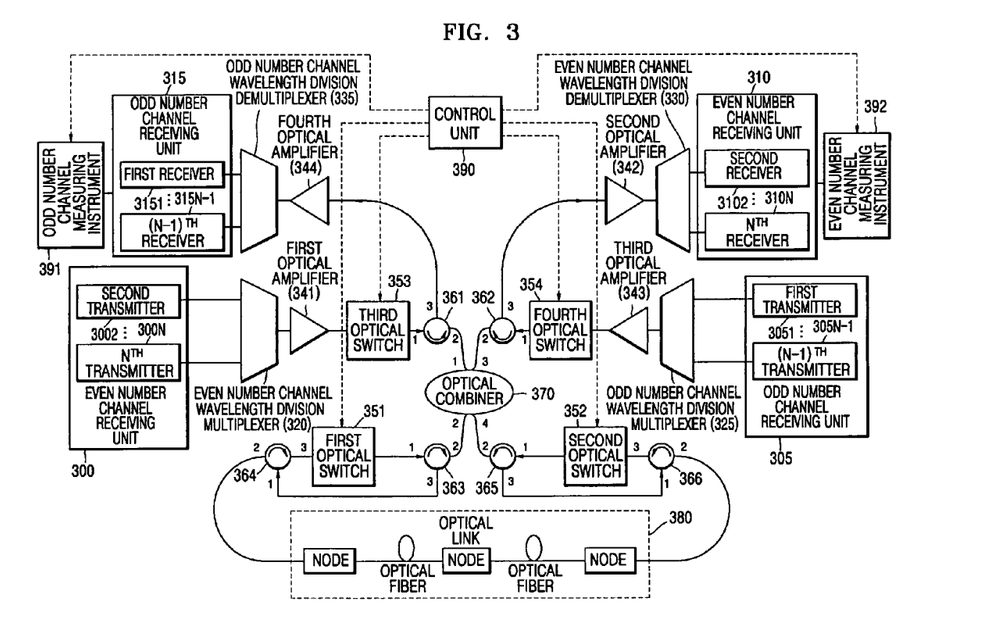
FIG. 3 is a view illustrating a configuration of a bidirectional optical recirculation loop transmitting device according to an embodiment of the present invention.

Referring to FIG. 3, to control a forward directional (clockwise) optical signal and a reverse directional (counterclockwise) optical signal, a control unit 390 generates a control signal (a pulse signal) to control a first optical switch 351, a second optical switch 352, a third optical witch 353, and a fourth optical switch 354, and a control signal (a pulse signal) to trigger an odd number channel measuring instrument 391 and an even number channel measuring instrument 392. An even number channel is defined as a route along which a signal proceeds in a forward direction (clockwise) and an odd number channel is defined as a route along which a signal proceeds in a reverse direction (counterclockwise).

The even number channel transmitting unit 300 generates and transmits a forward directional optical signal to proceed along the even number channel. The even number channel transmitting unit 300 includes a second transmitter 3002, . . . , and an $N^{th}$ transmitter 300N, where "N" is an even number.

An even number channel wavelength division multiplexer (WDM) 320 receives the forward directional optical signal from the even number channel transmitting unit 300 and multiplexes the received optical signal. A first optical amplifier 341 amplifies the forward directional optical signal multiplexed by the even number channel WDM 320. A third optical switch 353 selectively passes the forward directional optical signal output from the first optical amplifier 341 under the control of the control unit 390.

A first optical circulator 361 connects the forward directional optical signal input through the third optical switch 353 to a first port of the optical combiner 370 and separates a reverse directional optical signal input through the first port of the optical combiner 370 to proceed toward an odd number channel receiving unit 315.

An odd number channel transmitting unit 305 generates and transmits the reverse directional optical signal to proceed along the odd number channel. The odd number channel transmitting unit 305 includes a first transmitter 3051, . . . , and an (N−1)th transmitter 305N−1.

An odd number channel wavelength division multiplexer (WDM) 325 receives the reverse directional optical signal from the odd number channel transmitting unit 305 and multiplexes the received optical signal. A third optical amplifier 343 amplifies the reverse directional optical signal multiplexed by the odd number channel WDM 325. A fourth optical switch 354 selectively passes the reverse directional optical signal output from the third optical amplifier 343 under the control of the control unit 390.

A second optical circulator 362 connects the reverse directional optical signal input through the fourth optical switch 354 to a third port of the optical combiner 370 and separates the forward directional optical signal input through the third port of the optical combiner 370 to proceed toward an even number channel receiving unit 310.

A fourth optical amplifier 344 amplifies the reverse directional optical signal separated from the first optical circulator 361. An odd number channel wavelength division demultiplexer 335 receives the reverse directional optical signal from the fourth optical amplifier 344 and demultiplexes the received optical signal. An odd number channel receiving unit 315 receives the reverse directional optical signal for each channel from the odd number channel wavelength division demultiplexer 335. The odd number channel receiving unit 315 includes a first receiver 3151, . . . , and an $(N-1)^{th}$ receiver 315N−1.

The odd number channel measuring instrument 391 measures performance of an optical signal corresponding to a desired transmission distance with respect to the optical signal received through the odd number channel receiving unit 315 under the control of the control unit 390.

A second optical amplifier 342 amplifies the forward directional optical signal separated from the second optical circulator 362. An even number channel wavelength division demultiplexer 330 receives the forward directional optical signal from the second optical amplifier 342 and demultiplexes the received optical signal.

The even number channel receiving unit 310 receives the forward directional optical signal for each channel from the even number channel wavelength division demultiplexer 330. The even number channel receiving unit 310 includes a second receiver 3102, . . . , and an Nth receiver 310N.

The even number channel measuring instrument 392 measures performance of an optical signal corresponding to a desired transmission distance with respect to the optical signal received through the even number channel receiving unit 310 under the control of the control unit 390.

The optical combiner 370 having four ports and the first port, the second port, the third port, and the fourth port are connected to the first optical circulator 361, a third optical circulator 363, the second circulator 362, and a fifth optical circulator 365, respectively.

The forward directional optical signal generated from the even number channel transmitting unit 300 in the forward direction passes through the third optical switch 353 and is input to the first port of the optical combiner 370 through the first optical circulator 361.

Half of the forward directional optical signal input to the optical combiner 370 passes through the second optical circulator 362 via the third port of the optical combiner 370 and is transmitted to the even number channel receiving unit 310 so as to be a zero-turn signal.

The other half of the forward directional optical signal input to the optical combiner 370 is transmitted to a sixth optical circulator 366, bypassing the second optical switch 362, through the fourth port of the optical combiner 370 and the fifth optical circulator 365. The forward directional optical signal passing through the sixth optical circulator 366 is transmitted along an optical link 380 in the optical recirculation loop, sequentially passes through a fourth optical circulator 364, the first optical switch 351, and the third optical circulator 363, and arrives at the second port of the optical combiner 370.

Half of the forward directional optical signal arriving at the optical combiner 370 after making one turn along the optical link 380, is transmitted to the even number channel receiving unit 310 through the third port of the optical combiner 370 and the second optical circulator 362, so as to be a one-turn signal. The other half of the forward directional optical signal arriving at the optical combiner 370 after making one turn along the optical link 380, is transmitted through the sixth optical circulator 366, bypassing the second optical switch 352, through the fourth port of the optical combiner 370 and the fifth optical circulator 365. The optical signal transmitted through the sixth optical circulator 366 is transmitted along the optical link 380 and sequentially passes through the fourth optical circulator 364, the first optical switch 351, and the third optical circulator 363 to arrive again at the second port of the optical combiner 370.

By repeating the above process, the half of the forward directional optical signal input to the optical combiner 370 is transmitted to the second optical circulator 362 and then to the even number channel receiving unit 310. The other half of the forward directional optical signal is transmitted to circulate in the forward direction through the fifth optical circulator 365 and the optical link 380.

The reverse directional optical signal generated from the odd number channel transmitting unit 305 in the reverse direction passes through the fourth optical switch 354 and is input to the third port of the optical combiner 370 through the second optical circulator 362.

Half of the reverse directional optical signal input to the optical combiner 370 passes through the first optical circulator 361 via the first port of the optical combiner 370 and is transmitted to the odd number channel receiving unit 315 so as to be a zero-turn signal.

The other half of the reverse directional optical signal input to the optical combiner 370 is transmitted to the fourth optical circulator 364, bypassing the first optical switch 361, through the second port of the optical combiner 370 and the third optical circulator 363. The reverse directional optical signal passing through the fourth optical circulator 364 is transmitted along the optical link 380, sequentially passes through the sixth optical circulator 366, the second optical switch 352, and the fifth optical circulator 365, and arrives at the fourth port of the optical combiner 370.

Half of the reverse directional optical signal arriving at the optical combiner 370 after making one turn along the optical link 380, is transmitted to the odd number channel receiving unit 315 through the first port of the optical combiner 370 and the first optical circulator 361, so as to be a one-turn signal. The other half of the reverse directional optical signal arriving at the optical combiner 370 after making one turn along the optical link 380, is transmitted through the fourth optical circulator 364, bypassing the first optical switch 351, through the second port of the optical combiner 370 and the third optical circulator 363. The optical signal transmitted through the fourth optical circulator 364 is transmitted along the optical link 380 and sequentially passes through the sixth optical circulator 366, the second optical switch 352, and the fifth optical circulator 365 to arrive again at the fourth port of the optical combiner 370.

By repeating the above process, the half of the reverse directional optical signal input to the optical combiner 370 is transmitted to the first optical circulator 361 and then to the odd number channel receiving unit 315. The other half of the reverse directional optical signal is transmitted to circulate in the reverse direction through the third optical circulator 363 and the optical link 380.

In the performance of the respective optical circulators, the first optical circulator 361 outputs the forward directional optical signal output from the even number channel transmitting unit 300 in the optical combiner 370 and outputs the reverse directional optical signal output from the optical combiner 370 in the odd number receiving unit 315. The second optical circulator 362 outputs the reverse directional optical signal output from the odd number channel transmitting unit 305 in the optical combiner 370 and outputs the forward directional optical signal output from the optical combiner 370 in the even number receiving unit 310.

The third optical circulator 363 and the fourth optical circulator 364 allow the reverse optical signal to bypass the first optical switch 351 while the fifth optical circulator 365 and the sixth optical circulator 366 allow the forward optical signal to bypass the second optical switch 352. By including the first to sixth optical circulators 361, 362, 363, 364, 365, and 366 as above, the forward directional optical signal and the reverse directional optical signal, although sharing a bidirectional link, independently circulate the optical recirculation loop so that the optical recirculation loop is available for a bidirectional transmission system.

In the operation of the control unit 390, the control unit 390 controls the third optical switch 353 and the first optical switch 351 to operate in the difference states. That is, from a time point at which t=0 to a time point at which t=1T, the third optical switch 353 is in the "ON" state while the first optical switch 351 is in the "OFF" state. From the time point at which t=1 T to the time point at which t=nT, the third optical switch 353 is in the "OFF" state while the first optical switch 351 is in the "ON" state. It can be seen that a period when the third optical switch 353 remains in the "ON" state is equivalent to a time T needed for the optical signal to proceed in the optical link 380 in the optical recirculation loop.

The control of the first, second, third, and fourth optical switches 351, 352, 353, and 354 by the control unit 390 that are not described above will be described with reference to FIG. 2.

The control unit 390 generates a control signal to control the odd number channel measuring instrument 391 and an even number channel measuring instrument 392. Since the control unit 390 outputs the control signal to the odd number channel measuring instrument 391 and the even number channel measuring instrument 392, only a portion corresponding to a particular rotation number k is gated like the gate trigger of FIG. 2 so that only a value in a range from a time point at which t=kT to a time point at which t=(k+1)T is used as a test material. The other portion is excluded from the measuring material. Since there may be a contaminated optical signal at around a boundary region of the rotation number when gate trigger is performed, to avoid a measurement error, a protection time A is provided at either side of the boundary so that the performance of the optical signal is measured from a time point at which t=kT+Δ to a time point at which t=(k+1)T−Δ. By configuring the optical recirculation loop as above and conducting the test, a long distance transmission is made possible with a small number of test samples.

The third optical circulator 363, the first optical switch 351, and the fourth optical circulator 364 constitute a first connection unit which allows the forward directional optical signal and the reverse directional optical signal to proceed as described above under the control of the control unit 390. The fifth optical circulator 365, the second optical switch 352, and the sixth optical circulator 366 constitute a second connection unit which allows the forward directional optical signal and the reverse directional optical signal to proceed as described above under the control of the control unit 390.

Figure 4:
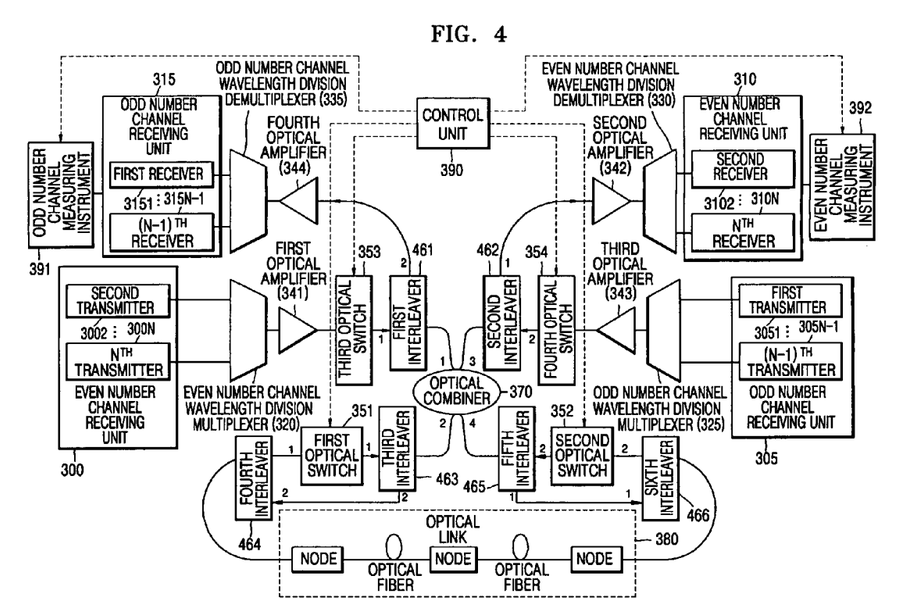
FIG. 4 is a view illustrating a configuration of a bidirectional optical recirculation loop transmitting device according to another embodiment of the present invention.

FIG. 4 is a view illustrating a configuration of a bidirectional optical recirculation loop transmitting device according to another embodiment of the present invention. Referring to FIG. 4, when a bi-direction is divided by the even channel and the odd channel as shown in FIG. 3, the bidirectional optical recirculation loop transmitting device can be configured by using an interleaver (IL). The IL has a first port and a second port which respectively accommodate the even number channel and the odd number channel and is a passive device in which bidirectional proceeding of a signal is possible.

For the even channel, an optical signal in a forward direction passes through the third optical switch 353 and is input to the first port of the optical combiner 370 having four ports, through the first port of a first IL 461. Half of the forward directional signal input to the optical combiner 370 is transmitted to the even number channel receiving unit 310 through the first port of a second IL 462 so as to be a zero-turn signal.

The other half of the forward directional optical signal input to the optical combiner 370 is transmitted to the first port of a sixth IL 466, bypassing the second optical switch 362, through the fourth port of the optical combiner 370 and the first port of a fifth IL 465. The forward directional optical signal passing through the sixth IL 466 is transmitted along the optical link 380 in the optical recirculation loop, sequentially passes through the first port of a fourth IL 464, the first optical switch 351, and the first port of a third IL 463, and arrives at the second port of the optical combiner 370.

Half of the forward directional optical signal arriving at the optical combiner 370 after making one turn along the optical link 380, is transmitted to the even number channel receiving unit 310, passing through the third port of the optical combiner 370 and the first port of the second IL 462, so as to be a one-turn signal. The other half of the forward directional optical signal arriving at the optical combiner 370 after making one turn along the optical link 380, is transmitted through the first port of the sixth IL 466, bypassing the second optical switch 352, through the fourth port of the optical combiner 370 and the first port of the fifth IL 465. The optical signal transmitted through the sixth IL 466 is transmitted along the optical link 380 and sequentially passes through the first port of the fourth IL 464, the first optical switch 351, and the first port of the third IL 463 to arrive again at the second port of the optical combiner 370.

As described above, the half of the forward directional optical signal input to the optical combiner 370 is transmitted to the second IL 462 and then to the even number channel receiving unit 310 while the other half of the forward directional optical signal is transmitted to the fifth IL 465 to circulate along the optical link 380 of the optical recirculation loop.

For the odd channel, an optical signal in a reverse direction passes through the fourth optical switch 354 and is input to the third port of the optical combiner 370, through the second port of the second IL 462. Half of the reverse directional optical signal input to the optical combiner 370 passes through the second port of the first IL 461 via the first port of the optical combiner 370 and is transmitted to the odd number channel receiving unit 315 so as to be a zero-turn signal.

The other half of the reverse directional optical signal input to the optical combiner 370 is transmitted to the second port of the fourth IL 464, bypassing the first optical switch 351, through the second port of the optical combiner 370 and the second port of the third IL 463. The reverse directional optical signal passing through the fourth IL 464 is transmitted along the optical link 380, sequentially passes through the second port of the sixth IL 466, the second optical switch 352, and the second port of the fifth IL 465, and arrives at the fourth port of the optical combiner 370.

Half of the reverse directional optical signal arriving at the optical combiner 370 after making one turn along the optical link 380, is transmitted to the odd number channel receiving unit 315 through the first port of the optical combiner 370 and the second port of the first IL 461, so as to be a one-turn signal. The other half of the reverse directional optical signal arriving at the optical combiner 370 after making one turn along the optical link 380, is transmitted through the second port of the fourth IL 464, bypassing the first optical switch 351, through the second port of the optical combiner 370 and the second port of the third IL 463. The optical signal transmitted through the fourth IL 464 is transmitted along the optical link 380 and sequentially passes through the second port of the sixth IL 466, the second optical switch 352, and the second port of the fifth IL 465 to arrive again at the fourth port of the optical combiner 370.

As described above, the half of the reverse directional optical signal input to the optical combiner 370 is transmitted to the first IL 461 and then to the odd number channel receiving unit 315 while the other half of the reverse directional optical signal is transmitted to the third IL 463 to circulate along the optical link 380 of the optical recirculation loop.

The third IL 463, the first optical switch 351, and the fourth IL 464 constitute the first connection unit to make the forward directional optical signal and the reverse directional optical signal proceed under the control of the control unit 390. Although, in FIG. 4, all the optical circulators of FIG. 3 are replaced with the interleavers, only a part of the optical circulators of FIG. 3 can be replaced to form another embodiment. Please refer to the description of FIG. 3 for portions not described in FIG. 4.

Figure 5:
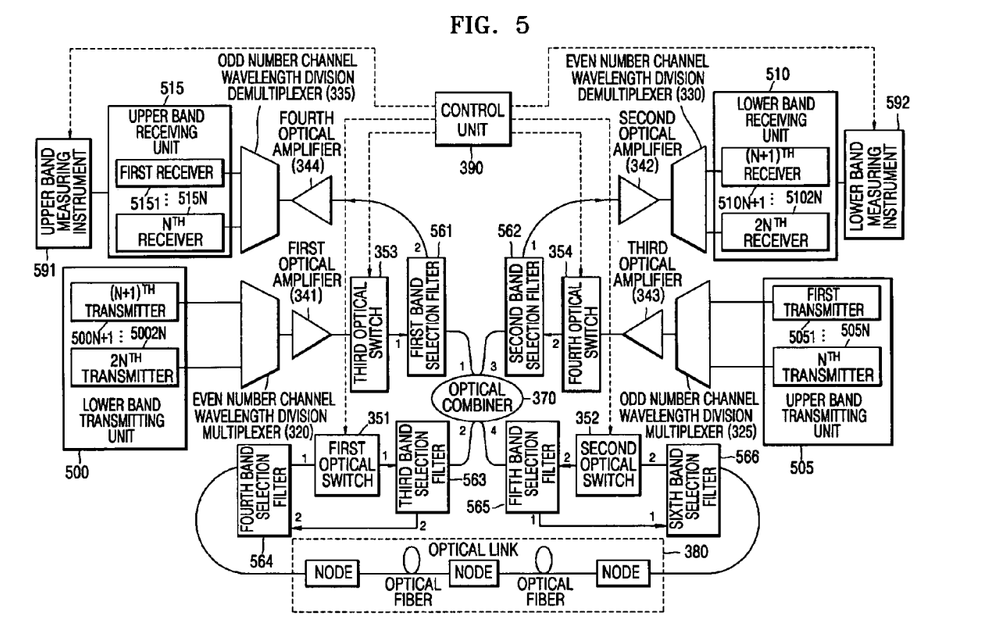
FIG. 5 is a view illustrating a configuration of a bidirectional optical recirculation loop transmitting device according to yet another embodiment of the present invention.

FIG. 5 is a view illustrating a configuration of a bidirectional optical recirculation loop transmitting device according to yet another embodiment of the present invention. Referring to FIG. 5, the bi-direction is divided not into the even number channel and the odd number channel as shown in FIGS. 3 and 4, but into a lower band and an upper band. The bidirectional optical recirculation loop transmitting device according to yet another embodiment of the present invention can be configured by using a band selection filter (a band coupler or a band separator).

The band selection filter has a first port and a second port which respectively accommodate the lower band and the upper band and is a passive device in which bidirectional proceeding of a signal is possible.

A lower band transmitting unit 500 of FIG. 5 corresponds to the even number channel transmitting unit 300 of FIG. 3 or 4 while a lower band receiving unit 510 of FIG. 5 corresponds to the even number channel receiving unit 310 of FIG. 3 or 4. An upper band transmitting unit 505 of FIG. 5 corresponds to the odd number channel transmitting unit 305 of FIG. 3 or 4 while an upper band receiving unit 515 of FIG. 5 corresponds to the odd number channel receiving unit 315 of FIG. 3 or 4.

The lower band transmitting unit 500 includes an (N+1)th transmitter 500N+1, . . . , and a $2N^{th}$ transmitter 5002N while the lower band receiving unit 510 includes an (N+1)th receiver 510N+1, . . . , and a $2N^{th}$ receiver 5102N. The upper band transmitting unit 505 includes a first transmitter 5051, . . . , and an $N^{th}$ transmitter 505N while the upper band receiving unit 515 includes a first receiver 5151, . . . , and an $N^{th}$ receiver 515N.

The first band selection filter 561 corresponds to the first IL 461 of FIG. 4; the second band selection filter 562 corresponds to the second IL 462 of FIG. 4; the third band selection filter 563 corresponds to the third IL 463 of FIG. 4; the fourth band selection filter 564 corresponds to the fourth IL 464 of FIG. 4; the fifth band selection filter 565 corresponds to the fifth IL 465 of FIG. 4; and the sixth band selection filter 566 corresponds to the sixth IL 466 of FIG. 4.

The third band selection filter 563, the first optical switch 351, and the fourth band selection filter 564 constitute a first connection unit to make the forward directional optical signal and the reverse directional optical signal proceed under the control of the control unit 390 as shown in FIGS. 3 and 4. The fifth band selection filter 565, the second optical switch 352, and the sixth band selection filter 566 constitute a second connection unit to make the forward directional optical signal and the reverse directional optical signal proceed under the control of the control unit 390 as shown in FIGS. 3 and 4.

Although, in FIG. 5, all the optical circulators of FIG. 3 or all the interleavers of FIG. 4 are replaced with the band selection filters, only a part of the optical circulators of FIG. 3 or the interleavers of FIG. 4 can be replaced to form another embodiment. Please refer to the description of FIG. 3 or 4 for portions not described in FIG. 5.

While this invention has been particularly shown and described with reference to preferred embodiments thereof, it will be understood by those skilled in the art that various changes in form and details may be made therein without departing from the spirit and scope of the invention as defined by the appended claims.

As described above, according to the bidirectional optical recirculation loop transmitting device according to the present invention, a drawback that the conventional unidirectional optical recirculation loop transmitting device measures performance of a uni-directional optical signal by forming an optical recirculation loop with respect to only a unidirectional transmission system and performing a long-distance transmission with a small number of test samples, is overcome, and an optical recirculation loop is formed with respect to a bidirectional transmission system so that the performance of the bidirectional optical signal can be simultaneously measured.

Thus, in a wavelength division multiple optical transmission system, since a bidirectional optical recirculation loop transmission apparatus capable of performing a long-distance transmission using a small number of test samples can be provided, a bidirectional long-distance transmission test is made possible.

What is claimed is:

1. A bidirectional optical recirculation loop transmitting device for transmitting a forward directional optical signal generated from an end and a reverse directional optical signal generated from the other end to the other end and the end, respectively, the device comprising:

an optical combiner having four ports which, when receiving an optical signal from a first port and a second port, separately outputs one to a third port and the other to a fourth port and, when receiving an optical signal from the third port and the fourth port, separately outputs one to the first port and the other to the second port;

a first optical circulator which receives the forward directional optical signal generated from the end and outputs the received forward directional optical signal to connect to the first port of the optical combiner, and receives the reverse directional optical signal from the first port of the optical combiner and outputs the received reverse directional optical signal to a receiving end of the reverse directional optical signal formed at the end;

a second optical circulator which receives the reverse directional optical signal generated from the other end and outputs the received reverse directional optical signal to connect to the third port of the optical combiner, and receives the forward directional optical signal from the third port of the optical combiner and outputs the received forward directional optical signal to a receiving end of the forward directional optical signal formed at the other end;

a first connection unit which allows an optical link and the second port of the optical combiner to be in an "ON" connection state during a period from a time point at which the forward directional optical signal is stopped from being input to the first optical circulator to a time point at which the input of the forward directional optical signal resumes; and a second connection unit which allows the optical link and the fourth port of the optical combiner to be in an "ON" connection state during a period from a time point at which the reverse directional optical signal is stopped from being input to the second optical circulator to a time point at which the input of the reverse directional optical signal resumes.

2. The device as claimed in claim 1, wherein the first connection unit comprises:

a first optical switch which allows the optical link and the second port of the optical combiner to be in an "ON" connection state during a period from a time point at which the forward directional optical signal is stopped from being input to the first optical circulator to a time point at which the input of the forward directional optical signal resumes;

a third optical circulator which is provided between the first optical switch and the second port of the optical combiner; and a fourth optical circulator which is provided between the first optical switch and the optical link, wherein the third and fourth optical circulators are connected to each other to bypass the first optical switch when receiving the reverse directional optical signal from the second port of the optical combiner, and are connected via the first optical switch when receiving the forward directional optical signal through the optical link.

3. The device as claimed in claim 2, wherein the second connection unit comprises:

a second optical switch which allows the optical link and the fourth port of the optical combiner to be in an "ON"

connection state during a period from a time point at which the reverse directional optical signal is stopped from being input to the second optical circulator to a time point at which the input of the reverse directional optical signal resumes;

a fifth optical circulator which is provided between the second optical switch and the fourth port of the optical combiner; and a sixth optical circulator which is provided between the second optical switch and the optical link, wherein the fifth and sixth optical circulators are connected to each other to bypass the second optical switch when receiving the forward directional optical signal from the fourth port of the optical combiner, and are connected via the second optical switch when receiving the reverse directional optical signal through the optical link.

4. The device as claimed in claim 1, further comprising a control unit which controls a transmitting end of the forward directional optical signal and a transmitting end of the reverse directional optical signal so that the forward directional optical signal and the reverse directional optical signal are input.

5. The device as claimed in claim 1, further comprising a first measuring instrument which is connected to the receiving end of the forward directional optical signal and measures performance by extracting the forward directional optical signal circulating a predetermined number of turns along the optical link; and a second measuring instrument which is connected to the receiving end of the forward directional optical signal and measures performance by extracting the forward directional optical signal circulating a predetermined number of turns along the optical link.

6. A bidirectional optical recirculation loop transmitting device for transmitting a forward directional optical signal generated from an end and a reverse directional optical signal generated from the other end to the other end and the end, respectively, the device comprising:

an optical combiner having four ports which, when receiving an optical signal from a first port and a second port, separately outputs one to a third port and the other to a fourth port and, when receiving an optical signal from the third port and the fourth port, separately outputs one to the first port and the other to the second port;

a first interleaver which receives the forward directional optical signal from a transmitting end of the forward directional optical signal and outputs the received forward directional optical signal to connect to the first port of the optical combiner, and receives the reverse directional optical signal from the first port of the optical combiner and outputs the received reverse directional optical signal to a receiving end of the reverse directional optical signal formed at the end;

a second interleaver which receives the reverse directional optical signal from a transmitting end of the reverse directional optical signal and outputs the received reverse directional optical signal to connect to the third port of the optical combiner, and receives the forward directional optical signal from the third port of the optical combiner and outputs the received forward directional optical signal to a receiving end of the forward directional optical signal formed at the other end;

a first connection unit which allows an optical link and the second port of the optical combiner to be in an "ON" connection state during a period from a time point at which the forward directional optical signal is stopped from being input to the first interleaver to a time point at which the input of the forward directional optical signal resumes; and a second connection unit which allows the optical link and the fourth port of the optical combiner to be in an "ON" connection state during a period from a time point at which the reverse directional optical signal is stopped from being input to the second interleaver to a time point at which the input of the reverse directional optical signal resumes.

7. The device as claimed in claim 6, wherein the first connection unit comprises:

a first optical switch which allows the optical link and the second port of the optical combiner to be in an "ON" connection state during a period from a time point at which the forward directional optical signal is stopped from being input to the first interleaver to a time point at which the input of the forward directional optical signal resumes;

a third interleaver which is provided between the first optical switch and the second port of the optical combiner; and a fourth interleaver which is provided between the first optical switch and the optical link, wherein the third and fourth interleavers are connected to each other to bypass the first optical switch when receiving the reverse directional optical signal from the second port of the optical combiner, and are connected via the first optical switch when receiving the forward directional optical signal through the optical link.

8. The device as claimed in claim 7, wherein the second connection unit comprises:

a second optical switch which allows the optical link and the fourth port of the optical combiner to be in an "ON" connection state during a period from a time point at which the reverse directional optical signal is stopped from being input to the second interleaver to a time point at which the input of the reverse directional optical signal resumes;

a fifth interleaver which is provided between the second optical switch and the fourth port of the optical combiner; and a sixth interleaver which is provided between the second optical switch and the optical link, wherein the fifth and sixth interleavers are connected to each other to bypass the second optical switch when receiving the forward directional optical signal from the fourth port of the optical combiner, and are connected via the second optical switch when receiving the reverse directional optical signal through the optical link.

9. The device as claimed in claim 6, further comprising a control unit which controls the transmitting end of the forward directional optical signal and the transmitting end of the reverse directional optical signal so that the forward directional optical signal and the reverse directional optical signal are input.

10. The device as claimed in claim 6, further comprising a first measuring instrument which is connected to the receiving end of the forward directional optical signal and measures performance by extracting the forward directional optical signal circulating a predetermined number of turns along the optical link; and a second measuring instrument which is connected to the receiving end of the forward directional optical signal and measures performance by extracting the forward directional optical signal circulating a predetermined number of turns along the optical link.

11. A bidirectional optical recirculation loop transmitting device for transmitting a forward directional optical signal generated from an end and formed of a lower band and a reverse directional optical signal generated from the other end and formed of an upper band to the other end and the end, respectively, the device comprising:

an optical combiner having four ports which, when receiving an optical signal from a first port and a second port, separately outputs one to a third port and the other to a fourth port and, when receiving an optical signal from the third port and the fourth port, separately outputs one to the first port and the other to the second port;

a first band selection filter which receives the forward directional optical signal from a transmitting end of the forward directional optical signal and outputs the received forward directional optical signal to connect to the first port of the optical combiner, and receives the reverse directional optical signal from the first port of the optical combiner and outputs the received reverse directional optical signal to a receiving end of the reverse directional optical signal formed at the end;

a second band selection filter which receives the reverse directional optical signal from a transmitting end of the reverse directional optical signal and outputs the received reverse directional optical signal to connect to the third port of the optical combiner, and receives the forward directional optical signal from the third port of the optical combiner and outputs the received forward directional optical signal to a receiving end of the forward directional optical signal formed at the other end;

a first connection unit which allows an optical link and the second port of the optical combiner to be in an "ON" connection state during a period from a time point at which the forward directional optical signal is stopped from being input to the first band selection filter to a time point at which the input of the forward directional optical signal resumes; and a second connection unit which allows the optical link and the fourth port of the optical combiner to be in an "ON" connection state during a period from a time point at which the reverse directional optical signal is stopped from being input to the second band selection filter to a time point at which the input of the reverse directional optical signal resumes.

12. The device as claimed in claim 11, wherein the first connection unit comprises:

a first optical switch which allows the optical link and the second port of the optical combiner to be in an "ON" connection state during a period from a time point at which the forward directional optical signal is stopped from being input to the first band selection filter to a time point at which the input of the forward directional optical signal resumes;

a third band selection filter which is provided between the first optical switch and the second port of the optical combiner; and a fourth band selection filter which is provided between the first optical switch and the optical link, wherein the third and fourth band selection filters are connected to each other to bypass the first optical switch when receiving the reverse directional optical signal from the second port of the optical combiner, and are connected via the first optical switch when receiving the forward directional optical signal through the optical link.

13. The device as claimed in claim 12, wherein the second connection unit comprises:

a second optical switch which allows the optical link and the fourth port of the optical combiner to be in an "ON" connection state during a period from a time point at which the reverse directional optical signal is stopped from being input to the second band selection filter to a time point at which the input of the reverse directional optical signal resumes;

a fifth band selection filter which is provided between the second optical switch and the fourth port of the optical combiner; and a sixth band selection filter which is provided between the second optical switch and the optical link, wherein the fifth and sixth band selection filters are connected to each other to bypass the second optical switch when receiving the forward directional optical signal from the fourth port of the optical combiner, and are connected via the second optical switch when receiving the reverse directional optical signal through the optical link.

14. The device as claimed in claim 11, further comprising a control unit which controls a transmitting end of the forward directional optical signal and a transmitting end of the reverse directional optical signal so that the forward directional optical signal and the reverse directional optical signal are input.

15. The device as claimed in claim 11, further comprising a first measuring instrument which is connected to the receiving end of the forward directional optical signal and measures performance by extracting the forward directional optical signal circulating a predetermined number of turns along the optical link; and a second measuring instrument which is connected to the receiving end of the forward directional optical signal and measures performance by extracting the forward directional optical signal circulating a predetermined number of turns along the optical link.

* * * * *